United States Patent
Sanders

(10) Patent No.: US 7,149,796 B2
(45) Date of Patent: Dec. 12, 2006

(54) INDEPENDENT SERVER DIAGNOSTIC PORT

(75) Inventor: Michael C. Sanders, deceased, late of Spring, TX (US); by Vivian McDaniel-Sanders, legal representative, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 789 days.

(21) Appl. No.: 10/020,809

(22) Filed: Dec. 12, 2001

(65) Prior Publication Data

US 2003/0110245 A1    Jun. 12, 2003

(51) Int. Cl.
  G06F 15/173    (2006.01)
(52) U.S. Cl. .................. 709/223; 709/238
(58) Field of Classification Search ............ 709/220, 709/223, 224, 238; 713/300; 714/11; 361/724, 361/725
See application file for complete search history.

(56) References Cited

U.S. PATENT DOCUMENTS

| | | | | |
|---|---|---|---|---|
| 5,388,032 A * | 2/1995 | Gill et al. ................ | 700/17 |
| 5,650,940 A * | 7/1997 | Tonozuka et al. .......... | 709/224 |
| 5,901,286 A * | 5/1999 | Danknick et al. ......... | 709/203 |
| 6,028,984 A * | 2/2000 | Kimball .................. | 709/249 |
| 6,411,506 B1 * | 6/2002 | Hipp et al. ............... | 361/686 |
| 6,414,958 B1 * | 7/2002 | Specht .................. | 370/395.53 |
| 6,469,899 B1 * | 10/2002 | Hastings et al. .......... | 361/724 |
| 6,473,788 B1 * | 10/2002 | Kim et al. ............... | 709/209 |
| 6,483,709 B1 * | 11/2002 | Layton .................. | 361/724 |
| 6,609,034 B1 * | 8/2003 | Behrens et al. ........... | 700/19 |
| 6,820,119 B1 * | 11/2004 | Omizo .................. | 709/223 |
| 6,845,410 B1 * | 1/2005 | Brown et al. ............. | 710/29 |
| 6,859,882 B1 * | 2/2005 | Fung ................... | 713/300 |
| 6,961,246 B1 * | 11/2005 | Dickey et al. ............ | 361/724 |
| 2002/0084994 A1 * | 7/2002 | Hansen .................. | 345/204 |

OTHER PUBLICATIONS

Lucas, P.; Cahill, K.; Peters, R.; Smedinghoff, J.; "Modern operators' consoles for accelerator control at Fermilab". 'Accelerator Science and Technology'., Conference Record of the 1991 IEEE, May 6-9, 1991 pp. 2523-2525 vol. 4.*

* cited by examiner

Primary Examiner—Marc D. Thompson

(57) ABSTRACT

A diagnostic port for diagnosing a rack mount server while the server is installed in a rack. Diagnosis may be performed using an external computer in one of two ways. First, the external computer is connected to the diagnostic port to run server operating system debug algorithms. Second, the diagnostic port may provide access to data and routines in a server management device located within the server. Each of these functions is accessible via separate connectors located on the user-accessible faceplate at the front the server. Alternatively, the functions may be accessible via an adapter that connects to a single connector at the front of the server. The server management functions are ordinarily accessible from the rear using existing network connections, but an internal switch selectably enables the diagnostic port if a mating connector is inserted.

7 Claims, 3 Drawing Sheets

INDEPENDENT SERVER DIAGNOSTIC PORT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to rack mounted computer servers. More specifically, the invention relates to a method and mechanism for diagnosing and debugging a rack mount server.

2. Background of the Invention

A natural progression for many modern electronic devices is to shrink in size over time and model generations. Miniaturization has been witnessed in devices such as audio and video playback equipment and cordless and cellular telephones. However, it is possible that this miniaturization process has had the greatest effect on computer systems. Portable and handheld computers are thinner and lighter than ever. Desktop systems, while roughly the same size as older generations, offer more features because more internal components can be installed. Similarly, server systems that used to occupy entire rooms can now fit into a single rack.

Much of the miniaturization of rack server systems can be attributed to the fact that servers do not necessarily require user input and output ("I/O") devices such as keyboards and monitors. A conventional rack server may include all the components and circuitry of a high-power desktop workstation, but without provisions (or minimal provisions) for user I/O. Thus, enclosures for rack servers continue to decrease in size. For example, a 1U rack server may comprise multiple processors, massive amounts of memory, exchangeable hard drives, expansion slots, and network cards, all within a standard 1¾" tall by 19" wide by 24" deep enclosure.

As rack mount servers decrease in size, the front and rear faceplates of these servers also become limited in area. The front face of rack mount servers typically include one or more hot plug hard drives, floppy drives and CD or DVD drives. The rear face commonly includes the I/O data ports, such as ethernet, firewire, expansion bus slots, and serial data ports. In addition, power connections are also typically located at the rear of the server. During normal operations, most (if not all) of the information coming into and out of conventional servers passes through the rear faceplate. This includes provisions for remotely accessing and operating individual servers. Access to system management hardware or firmware or the server operating system are typically done through network connections or through a dedicated management port at the rear of the server. In the event a server goes down or otherwise becomes inoperable, system administrators will remotely access the server via one of these methods.

Each of these data, power, and management connections are accessed via backplanes or extensive amounts of cabling, which makes for an incredibly cluttered environment. Considering the fact that each rack can have dozens of servers, each with its own set of data and power connections and that multiple racks may be placed side by side and pushed up against a wall, it is easy to see how access to the rear of these servers quickly becomes limited. Unfortunately, diagnosing a rack mount server involves accessing the back panel to get to the network or management ports. Sometimes, because the rear of the rack is so cluttered, the most practical way to diagnose a server is to simply pull the server out of the rack. Unfortunately, this creates other issues such as losing power connections and perhaps losing conditions that may have contributed the server failure in the first place.

It would therefore be desirable to provide an independent diagnostic port at the front surface of a rack mount server. The novel diagnostic port would advantageously allow system administrators to easily access debug routines in the server operating system or system management information internal to the server. In addition, the improved method would eliminate the need to remove a server from a rack prior to diagnosing and thereby maintain any conditions that may have contributed to error indications.

BRIEF SUMMARY OF THE INVENTION

The problems noted above are solved in large part by a rack mount computer server, comprising a central processing unit ("CPU"), a system memory coupled to said CPU, and a server management device configured to control server management architecture. The server management device is accessible by a remote console via ports located at the front and the rear of the computer server. Access to the server management device is provided through a switch that permits access from either the front or the rear of the server. Ordinarily, the switch enables the rear port, but automatically switches to the front port if the front port is in use. Access to the server management device is preferably provided through RJ-45 receptacles located at the front and at the rear of the server.

The server also includes a data port in the front of the server that provides access to server operating system debug routines. This data port is preferably an RS-232 serial data port. Access to the server management device and to the operating system debug routines are preferably provided via distinct connector ports at the front of the server, but may alternatively be provided via an adapter that connects to a single connector port at the front of the server. This adapter preferably includes three connectors: a first for accessing the server management device, a second for accessing operating system debug information, and a third for passing data between the first and second connectors to a mating connector accessible from the front of the rack mount server.

During diagnosis, the server is presumably installed in a rack and an external computer (perhaps a laptop) is connected to the server using the debug port. The external computer may thus execute server operating system debug algorithms. Similarly, the external computer can access data and routines in the server management device. In this manner, the external computer emulates a remote console connection such as may be established through a network port at the rear of the server. In fact, access to the server management device is possible from either the front or the rear, but the remote console connection at the front of the server is given priority if an external computer is physically coupled to the network port at the front of the server.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
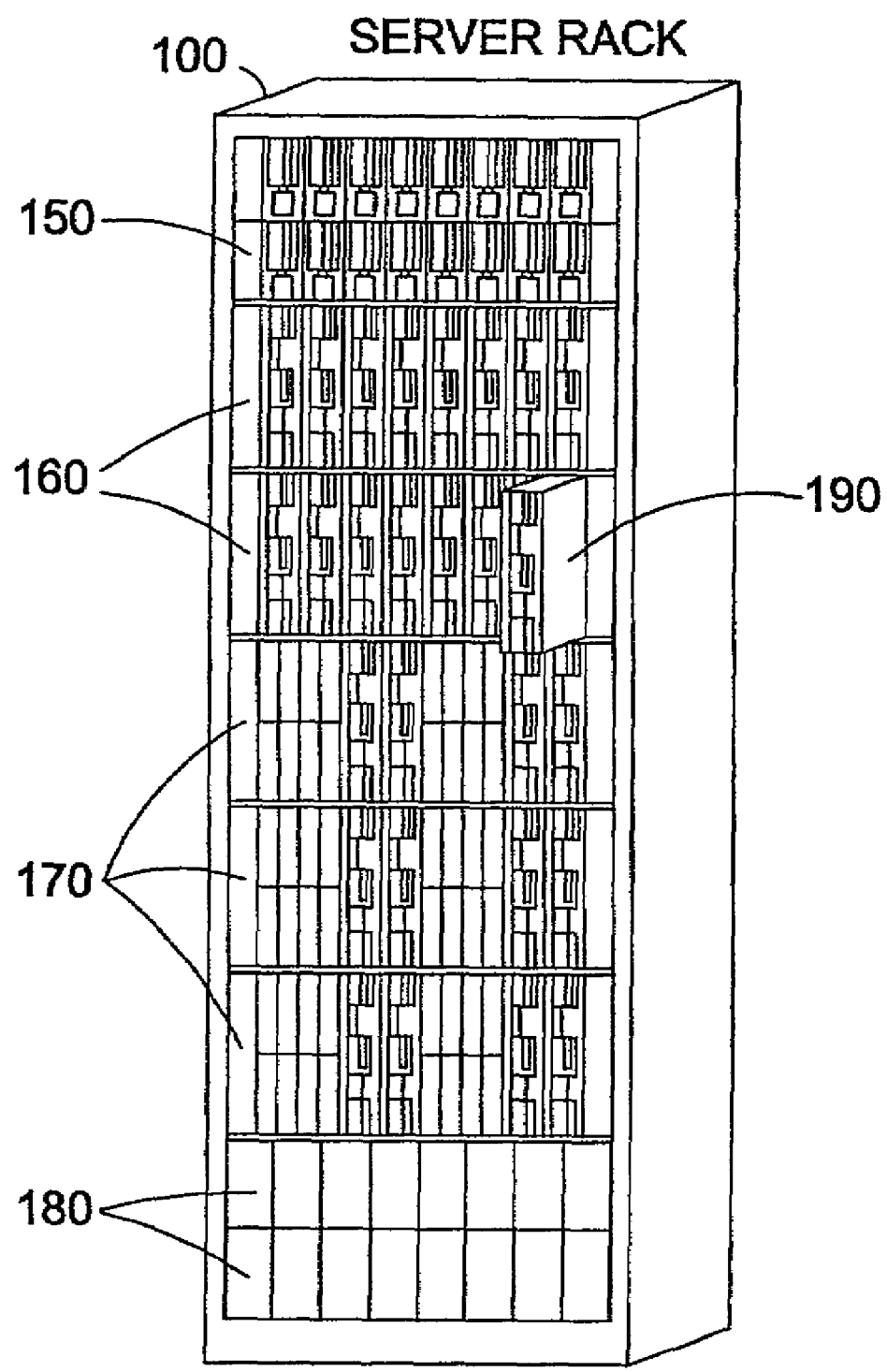
FIG. 1 shows a pictorial representation of a computer server rack in accordance with the preferred embodiment.

Referring now to FIG. 1, rack system 100 represents a server rack in accordance with the preferred embodiment and comprises various chassis, server, and power supply components as depicted. For illustrative purposes, server rack 100 is fitted with hardware comprising front end servers 150, application servers 160, back-end servers 170 and power supplies 180. Power supplies 180 are preferably redundant supplies that provide power to servers 150, 160, 170. Server rack 100 may also be fitted with other hardware and in different configurations as will be recognized by those skilled in the art. For the purposes of this description of the preferred embodiment, however, it may be assumed that the rack includes servers of the type described below.

Each of the servers 150, 160, 170 are preferably encased in a modular, removable housing called a "blade" 190. These blades 190 are installed in any of a plurality of modular chassis subframes within rack 100. Though not necessarily discernable from FIG. 1, the server rack 100 is preferably comprised of six server chassis and two power chassis. Within the server chassis, server blades 190 are designed to be fully interchangeable with one another. Thus, if a server goes down and needs to be replaced, the existing blade is simply swapped for a new blade. Front end servers 150 are preferably designed for less demanding tasks than the application servers 160 and back-end servers 170. For example, a front-end server 150 might be used for tasks such as an individual web servers or for dedicated applications such as firewalls or for DNS lookup. Application servers 160, on the other hand, may be used for more complex web and ASP ("Application Service Provider") hosting or media streaming. Back-end servers 170 might be used as database servers or as gateways to a storage area network.

The blade form factor for front-end servers 150 may be smaller than for application 160 and back-end 170 servers. Similarly, application servers 160 are less powerful and can be made to occupy less space than back-end servers 170. However, in accordance with the preferred embodiment, each of these types of server blades may be installed in any location within the server rack 100. More specifically, the server chassis are preferably configured to accept any type of server 150, 160, 170. Naturally, the size of the various types of servers 150, 160, 170 will determine how many of each server will fit in a given chassis.

Figure 2:
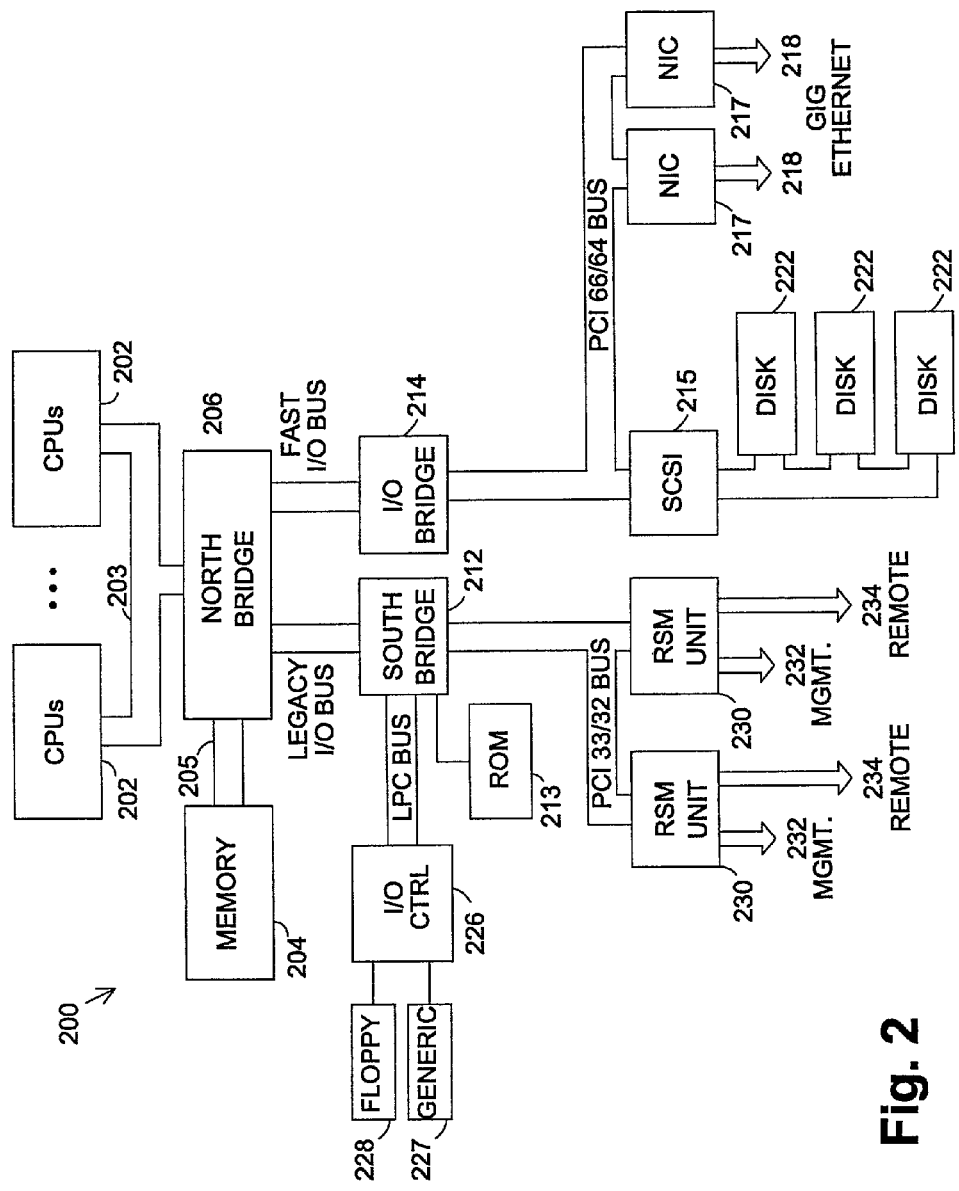
FIG. 2 shows a block diagram of a computer server in which the preferred embodiment may be implemented.

Referring now to FIG. 2, a representative server system 200 that may be encased in server blade 190 is illustrated. It is noted that many other representative configurations exist and that this embodiment is described for illustrative purposes. The server 200 of FIG. 2 preferably includes multiple CPUs 202 coupled to a bridge logic device 206 via a CPU bus 203. The bridge logic device 206 is sometimes referred to as a "North bridge" for no other reason than it often is depicted at the upper end of a computer system drawing. The North bridge 206 also preferably comprises a memory controller (not shown) to access and control a main memory array 204 via a memory bus 205. The North bridge 206 couples CPUs 202 and memory 204 to each other and to various peripheral devices in the system via one or more high-speed, narrow, source-synchronous expansion buses such as a Fast I/O bus and a Legacy I/O bus. The North bridge 206 can couple additional "high-speed narrow" bus links other than those shown in FIG. 2 to attach other bridge devices and other buses such as a PCI-X bus segment to which additional peripherals such as a Fibre Channel or Infiniband adapters (not shown) may be coupled. The embodiment shown in FIG. 2 is not intended to limit the scope of possible server architectures.

The Fast I/O bus shown in FIG. 2 may be coupled to the North bridge 206. In this preferred embodiment, the Fast I/O bus attaches an I/O bridge 214 that provides access to a high-speed 66 Mhz, 64-bit PCI bus segment. A SCSI controller 215 preferably resides on this high speed PCI bus and controls multiple fixed disk drives 222. In accordance with the preferred embodiment, the disk drives 222 are preferably hot-pluggable, but may also be fixed. The high speed PCI bus also provides communications capability to network interface cards ("NIC") 217 that provide redundant access to a Gigabit Ethernet network 218 for communication with other computers or servers. The redundant NICs 217 may be integrated onto the motherboard as presumed by FIG. 2, or they may be plugged into expansion slots (not shown) that are connected to the PCI bus. Furthermore, while a Gigabit Ethernet adapter is used in the preferred embodiment, the network card 217 may alternatively conform to any network protocol including IP ("Internet Protocol") standards such as 10/100 Mbps Ethernet or alternatively Infiniband ("IB") protocols.

The Legacy I/O bus is preferably used to connect legacy peripherals and a primary PCI bus via a separate bridge logic device 212. This bridge logic 212 is sometimes referred to as a "South bridge" reflecting its location vis-à-vis the North bridge 206 in a typical computer system drawing. An example of such bridge logic is described in U.S. Pat. No. 5,634,073, assigned to Compaq Computer Corporation. The South bridge 212 provides access to the system ROM 213 and provides a low-pin count ("LPC") bus to legacy peripherals coupled to an I/O controller 226. The I/O controller 226 typically interfaces to basic input/output devices such as a floppy disk drive 228 and, if desired, various other input switches such as a generic I/O port 227 or a power switch and a suspend switch (not shown). The South bridge 212 also may provide one or more expansion buses, but preferably provides a 32-bit 33 Mhz PCI bus segment on which various devices may be disposed. It should be noted that the Legacy I/O bus may be narrower than other "high speed narrow" buses if it only needs to satisfy the bandwidth requirements of peripherals disposed on the 33 Mhz, 32-bit PCI bus segment.

Various components that comply with the bus protocol of the 33 Mhz, 32-bit PCI bus may reside on this bus, such as redundant Remote Server Management ("RSM") units 230. According to the preferred embodiment, the RSM 230 is a multipurpose management ASIC chip that provides various management facilities. The RSM ASIC 230 preferably includes an input/output ("I/O") processor (not shown) to provide intelligent control of the management architecture in the server 200.

In addition, the RSM 230 also preferably includes one or more out-of-band communication interfaces such as a remote or virtual console interface 234 and a power management interface 232. These communication interfaces permit out-of-band communication with the RSM 230 to enable remote monitoring, control, and detection of various system management events, including power requirements for the server 200. Thus, in the event of a system failure or errors, a system administrator may remotely connect to server 200 through the remote console interface 234 to perform a number of tasks including system monitoring and diagnosis.

If there is any sort of communications problem between the server 200 and the remote console location, diagnosing the server becomes virtually impossible. At a point like this, a system manager cannot tell if the problem is in the network or in the server 200. Thus, the preferred diagnostic port shown in FIG. 3 provides an effected means of diagnosing and debugging the server 200 without being dependent on a network interface.

Figure 3:
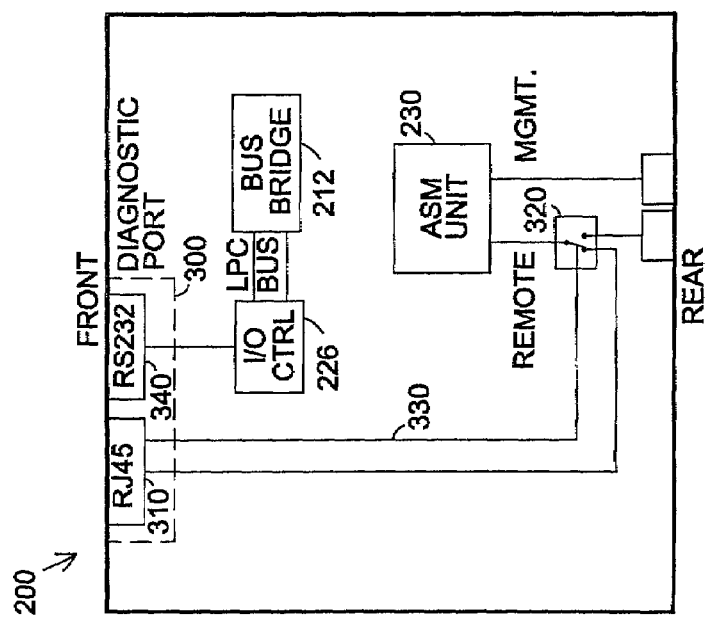
FIG. 3 shows a schematic of the preferred diagnostic port as implemented in the server of FIG. 2.

Referring now to FIG. 3, a simplified diagram of the server of FIG. 2 is shown. Server 200, as shown in FIG. 3, includes the preferred diagnostic port 300, which is situated on the front face of the server. The diagnostic port 300 preferably includes access to two separate functions, and as such, includes two different connectors. The first connector is preferably an industry standard RJ-45 ethernet connector that provides access to RSM unit 230. It is envisioned that a system administrator may link up to the server 200 with a diagnostic computer (perhaps a laptop) using a simple ethernet cable and run any of the system management software loaded into RSM 230. In addition, this connection may also allow an administrator to draw up diagnostic programs, perform a PXE boot, or perhaps even load an operating system ("OS") onto server 200. In short, the ethernet connection in the diagnostic port 300 provides access to all of the functionality of the RSM unit from the front of the server 200.

To prevent duplicate access to the RSM unit 230, a quick switch 320 is provided that toggles the connection to RSM 230 between the console port at the rear of the server and the diagnostic port at the front of the server. This switch 320 is preferably controlled by a sideband signal 330 that detects when the ethernet connector 310 in the diagnostic port is in use. By default, the switch preferably connects the RSM unit 230 to the console interface at the rear and switches to the front port only when connector 310 is engaged.

In addition to ethernet connector 310, the diagnostic port 300 also preferably includes a COM port connection 340. In accordance with standard industry usage, the COM port is preferably implemented as an RS-232 serial port connector and is included for access to Windows debug software. The connector itself is preferably embodied as a DB-9 connector, but a DB-25 connector in compliance with the RS-232 specification may also be used. Those skilled in the art will recognize the types of debug operations that may be executed through a Windows debug port as provided here, including accessing the operating system kernel mode and gathering of system information such as memory contents, processor register contents, process ids, hardware profiles, and so forth.

The COM port 340 is preferably coupled to a bus bridge 212 in server 200. In the server 200 shown in FIG. 2, the COM serial port 340 may connect to the south bridge 212 via the I/O controller 226 and the LPC bus. However, as servers and computers in general tend to stray from the use of COM ports for access to the operating system, other solutions for the Windows debug port may be used. It is envisioned that future embodiments may include IEEE 1394 or USB ports for access to the Windows debug functionality.

In general, it must be noted that while specific connectors have been disclosed for use with the preferred embodiment, these are not intended to limit the scope of possible connectors that may be used for the diagnostic port. For instance, instead of the RJ-45 and RS-232 connectors described, various other parallel or serial connections such as those used with universal serial bus ("USB"), IEEE 1394 Firewire, or Infiniband may suffice for the purposes of the diagnostic port 300 as long as the functionality described herein is maintained.

Figure 4:
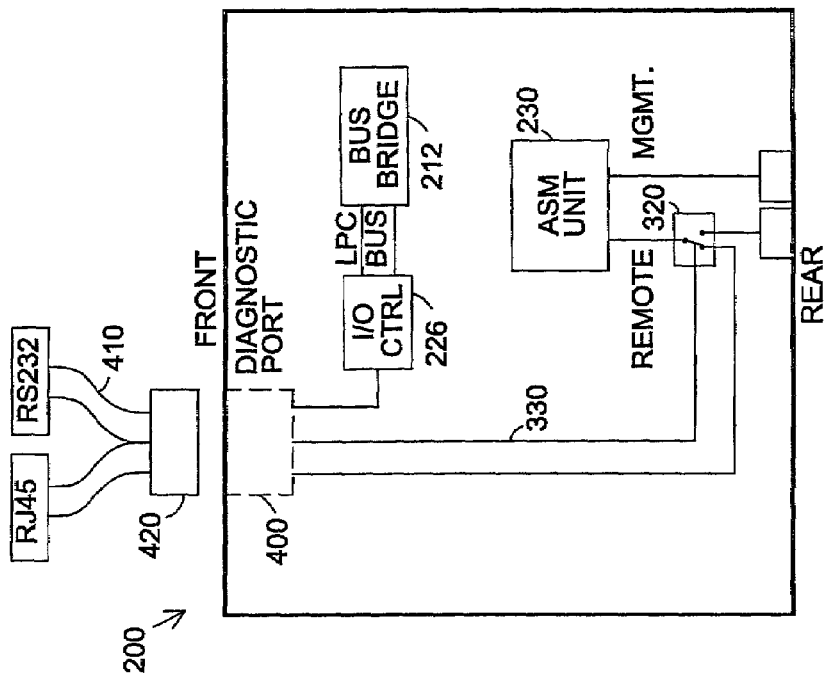
FIG. 4 shows a schematic of an alternative diagnostic port as implemented in the server of FIG. 2.

To conserve space or in the event space is limited on the front face of server 200, an alternative embodiment as shown in FIG. 4 may be incorporated. This particular embodiment uses a single connector 400 for access to both the remote management functions of RSM 230 and the serial Windows debug connectivity discussed above. To access these functions, a separate adapter 410 is provided with a mating connector 420 configured to connect with diagnostic connector 400. The adapter may be a solid adapter with the appropriate connectors at either end or may consist of flying leads. In addition, other form factors such as those associated with Type I, II, or III PC Cards or Cardbus cards with attached dongles may provide the necessary connections while occupying a limited amount of space.

The improved server diagnostic port described above provides a number of advantages over conventional schemes. First of all, since the diagnostic port is located at the front of the server, system administrators may debug and diagnose the server without needing to delve into the morass of wiring and connections at the rear of the server. Also, diagnostic port occupies a limited amount of space in servers that already have limited front facial surface area. Lastly, diagnostic port permits diagnosis and debugging of the server while it is still mounted in a rack.

The above discussion is meant to be illustrative of the principles and various embodiments of the present invention. Numerous variations and modifications will become apparent to those skilled in the art once the above disclosure is fully appreciated. For example, whereas physical connections have been shown for coupling an external computer to the server 200, wireless or infrared methods may work as well. However, in the wireless case, an additional provision may be needed to arm the receiving server so that a wireless link is established only with the desired server. It is intended that the following claims be interpreted to embrace all such variations and modifications.

What is claimed is:

1. A rack mount computer server, comprising:
 a central processing unit ("CPU");
 a system memory coupled to the CPU;

a server management device coupled through a bus to the CPU that is configured to control server management architecture;
a front network port located at a front surface of the server:
a rear network port located at a rear surface of the server; and
a switch
wherein a communications link is established between the server management device and a remote console through the front network port located or through the rear network port; and
wherein said switch establishes said communications link between said rear network port and said server management device when no remote console is connected to said front network port, but upon connecting the remote console to said front network port, said switch automatically establishes said communications link between said front network port and said server management device.

2. The server of claim 1 wherein access to the server management device is provided through an RJ-45 receptacle located at the front and at the rear of the server.

3. The server of claim 1 further comprising:
a data port in the front of the server;
wherein the data port provides access to server operating system debug routines.

4. The server of claim 3 wherein the data port is an RS-232 serial data port.

5. The server of claim 3 wherein the front network port that provides access to the server management device and the data port that provides access to the operating system debug routines are provided by separate connectors located at the front of the server.

6. The server of claim 3 wherein the front network port that provides access to the server management device and the data port that provides access to the operating system debug routines are provided by an adapter that connects to a single connector located at the front of the server.

7. A method of diagnosing a rack mount server while the server is installed in a rack, comprising:
establishing connectivity between a rear network port at the rear of the server and a server management device;
connecting an external computer to the server using a front port located on the user-accessible faceplate at the front the server; and
based on the external computer being connected to the front port, automatically disconnecting said rear network port from said server management device and re-establishing connectivity between said server management device and said front port.

* * * * *

UNITED STATES PATENT AND TRADEMARK OFFICE
CERTIFICATE OF CORRECTION

PATENT NO. : 7,149,796 B2  Page 1 of 1
APPLICATION NO. : 10/020809
DATED : December 12, 2006
INVENTOR(S) : Michael C. Sanders It is certified that error appears in the above-identified patent and that said Letters Patent is hereby corrected as shown below:

In column 7, line 5, in Claim 1, delete "server:" and insert -- server; --, therefor.

In column 7, line 8, in Claim I, delete "switch" and insert -- switch; --, therefor.

Signed and Sealed this

Twenty-third Day of June, 2009

JOHN DOLL
*Acting Director of the United States Patent and Trademark Office*